(12) United States Patent (10) Patent No.: US 8,788,507 B1
Venugopal et al. (45) Date of Patent: Jul. 22, 2014

(54) WATERMARKING OF STRUCTURED RESULTS AND WATERMARK GENERATION

(75) Inventors: Ashish Venugopal, Emeryville, CA (US); Jurij Ganitkevic, Baltimore, MD (US); Franz Josef Och, Palo Alto, CA (US); David Robert Talbot, San Francisco, CA (US); Jakob David Uszkoreit, San Francisco, CA (US)

(73) Assignee: Google Inc., Mountain View, CA (US)

( * ) Notice: Subject to any disclaimer, the term of this patent is extended or adjusted under 35 U.S.C. 154(b) by 265 days.

(21) Appl. No.: 13/296,451

(22) Filed: Nov. 15, 2011

Related U.S. Application Data (60) Provisional application No. 61/469,418, filed on Mar. 30, 2011.

(51) Int. Cl.
*G06F 7/00* (2006.01)

(52) U.S. Cl.
USPC .......... 707/748; 707/694; 707/723; 713/176; 713/193

(58) Field of Classification Search
USPC ............... 707/723, 748, 694; 713/176, 193
See application file for complete search history.

(56) References Cited

U.S. PATENT DOCUMENTS

| | | | | |
|---|---|---|---|---|
| 6,397,234 B1 * | 5/2002 | O'Brien et al. | ............... | 708/200 |
| 2010/0169293 A1 * | 7/2010 | Gerber | ......................... | 707/706 |

OTHER PUBLICATIONS

"Watermarking relational data: framework, algorithms and analysis" Rakesh Agrawal, Peter J. Haas, Jerry Kiernan Jul. 10, 2003—The VLDB Journal.*
"Electronic Marking and Identification Techniques to Discourage Document Copying" J. Brassil, S,Low, N. Maxemchuk, L. O'Gorman 1994—AT&T Bell Laboratories.*
Agrawal, R. et al., "Watermarking relational data: framework, algorithms and analysis," The VLDB Journal (2003), vol. 12, pp. 157-169.
Brassil, J. et al., "Electronic Marking and Identification Technique to Discourage Document Copying," AT&T Bell Laboratories, IEEE 1994, pp. 1278-1287.
U.S. Office Action dated Feb. 27, 2014 for co-pending related U.S. Appl. No. 13/296,460 (10 pages).

* cited by examiner

*Primary Examiner* — Hosain Alam
*Assistant Examiner* — Bruce Witzenburg
(74) *Attorney, Agent, or Firm* — Remarck Law Group PLC

(57) ABSTRACT

A way of generating a watermark for a structured result, such as a search result or a machine translation. A hash function is used to generate a bit sequence for each of a plurality of structured results. A ranking score is generated for each resulting bit sequence. The ranking score can be based on the detectability of the bit sequence compared to a randomly-generated bit sequence and the quality of each of the structured results. A structured result is selected as the watermarked structured result based upon the ranking score.

16 Claims, 6 Drawing Sheets

WATERMARKING OF STRUCTURED RESULTS AND WATERMARK GENERATION

CROSS-REFERENCE TO RELATED APPLICATIONS

This application claims the benefit of U.S. Provisional Application No. 61/469,418, which was filed on Mar. 30, 2011. The disclosure of the above application is incorporated herein by reference in its entirety.

BACKGROUND

Machine learning-based applications provide structured results to given inputs such as phrases to be machine translated, search queries, text and rich media for machine summarization, data to be processed, etc. The machine learning algorithms used in these applications often rely upon human-generated data, some of which may be drawn from public sources, such as the web. For example, machine translation applications can rely upon human-generated text on the web as a source of parser training data.

Many applications publish their machine-generated output online, thereby contaminating the web as a reliable source of human-generated data. For example, the web has substantial populations of both machine-translated output and human-generated translations with no convenient way of distinguishing between them. As a result, applications that mine data from the web with the goal of learning to simulate human behavior will learn from data contaminated with machine-generated content. The resulting simulations will therefore exhibit less fidelity to actual human behavior.

BRIEF SUMMARY

According to an embodiment of the disclosed subject matter, the implementation can receive a plurality of alternative structured results of a query and compute a function (such as a hash) of at least part of each structured result to produce a bit sequence. The implementation can compute a ranking score for each structured result based upon the detectability of a watermark (e.g., based upon one or more properties of the bit sequence) and the quality of the result. The implementation can select a structured result from among the alternatives based upon a ranking score that suitably balances watermark detectability and quality of the result. The selected result can be published and later tested to determine if it is a watermarked result. By watermarking machine-generated output, machine-generated content can be distinguished from human-generated content.

Additional features, advantages, and embodiments of the disclosed subject matter may be set forth or are apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Embodiments of the disclosed subject matter can be used to generate structured results for publication that contain a watermark that can be probabilistically identified. The watermark can be robust to local editing operations and can be manipulated to accommodate tradeoffs between the ability to identify the watermark and the quality of the watermarked structured results.

A structured result can be an output that is generated in response to an input (such as a query, a phrase to be translated, content to be processed, etc.), where the output includes elements whose order and/or identity are important to the quality of the result. Examples of structured output include machine translations, automatic text and rich media summarizations, machine-generated search results, human-generated output such as candidate translations of a source text, etc.

In accordance with embodiments of the disclosed subject matter, at least part of a structured result can be hashed to produce a bit string. A hash function can include any one-way procedure or mathematical function that converts a large, potentially variable-sized amount of data into a generally smaller datum, which is often of fixed size. The value returned by a hash function can be called a hash value or simply a hash. Examples of hashing techniques include MD-4, MD-5, SHA-1, etc. The watermark, hash function and bit sequence may be invisible to a viewer of the structured result. For example, a user who receives search results based on a user input search query may not detect or easily decipher a watermark, hash function or bit sequence associated with the watermark.

A bit sequence is any sequence of zeros and ones. A hash value can be a bit sequence that may represent a numerical value in a binary form. The length of the bit sequence may be based on (without limitation) a numerical value, a predetermined length, the number of entries in an outputted structured result, etc., or a combination thereof.

Figure 1:
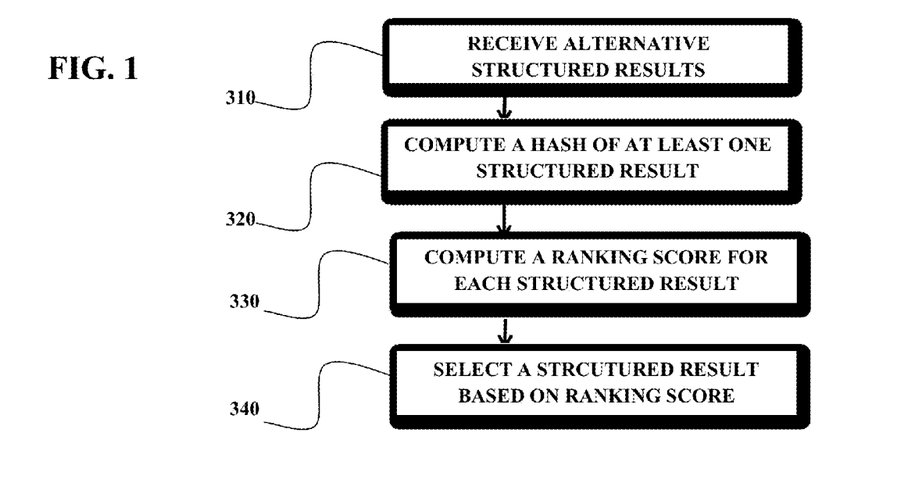
FIG. 1 shows a flowchart for watermarking a structured result according to an embodiment of the disclosed subject matter.

As shown in FIG. 1, according to embodiments of the disclosed subject matter, the implementation can receive several alternative structured results 310 in response to a given input. For example, a search engine can return alternative sets of search results in response to a given query, or a machine-translation application can return a set of alternative candidate translations based upon a given input sentence. The alternative structured results may be ordered based on the estimated or actual quality. For example, the alternative search results may be ordered by best match, view count, etc. or a combination thereof. A set of candidate translations may be ordered based on (without limitation) a ranking of the translation quality made by the machine-translation application, a k-best list of parsed translations, etc., or a combination thereof. A hash can be computed 320 for at least part of each of the alternative structured results to produce a bit sequence for each structured result. For example, if a search query results in one hundred ordered elements (such as links to resources on the Web), then a hash may be computed for the twentieth to the fortieth element, the third to the ninth and the fifty first to the sixty third, etc., or for the whole list of elements in its entirety.

According to some embodiments of the disclosed subject matter, a structured result can be divided into a plurality of sub-results or the purpose of producing a bit sequence. The sub-results can be selected based on, but not limited to, a random selection, a predetermined algorithm, a percentage of the number of results, etc. or a combination thereof. A sub-result hash value may be calculated for each of the plurality of sub-results. As shown in Table 2, a search query resulting in a hundred results is divided into four equal parts, each sub-result containing twenty-five search results. A sub-result hash value is calculated for each of the four sub-result groups.

TABLE 2

| Sub-Result Group | Ordered Search Results | Sub-Result Hash Value |
|---|---|---|
| 1 | 1-25 | 1100 |
| 2 | 26-50 | 1001 |
| 3 | 51-75 | 1000 |
| 4 | 76-100 | 1111 |

The hash values shown above have been shortened for the purpose of illustration. The actual hash values are likely to be longer. A bit sequence for the structured result can be generated by concatenating the bit sequences of the sub-results. For example, a bit sequence for the structured result of Table 2 may be calculated by concatenating the sub-result hash values for all four sub-results. Accordingly, a hash value for the structured result can be 1100100110001111. Dividing a structured result into sub-results, generating sub-result hash values and concatenating the hash values allows for robust hash value. If a portion of the structured result is modified (e.g., by an editing operation), the impact to the structured result's bit sequence is lower than if the implementation produces a bit sequence based on a single hash of the whole result. For example, according to the search results of Table 2, if a change is made to ordered search results 9-12 then the sub-result hash value for the second sub-result group may change to a different value than 1100. If it changes to 0101, only the first four bits of the structured result hash value change such that the modified structured result hash value is 0101100110001111. In contrast, if the structured result is not divided into sub-groups, the entire hash value can change drastically based upon even a small change in one part of the structured result.

A hash function whose output bits are independent (do not rely on adjacent bits) can be used according to embodiments of the disclosed subject matter. A watermark can be generated by selecting an alternative structured result having a hash that exhibits one or more properties that are unlikely under a given probability distribution. For the purposes of illustration and not to limit to scope of the claims, a watermark can be generated in view of the binomial probability distribution with parameter $p=0.5$, i.e., a bit value of 1 is equally as likely to be present in a given position as a bit value of 0. A given bit sequence can be tested using a null hypothesis for a statistical test on a given hash value, such as testing how it is likely to have been generated from a binomial distribution with $p=0.5$.

The use of a hash function and the binomial distribution are meant to illustrate and not limit the disclosed subject matter. In various embodiments of the disclosed subject matter, the bits sequence can be generated by functions other than a hash function and may be selected in view of probability distributions other than the binomial distribution.

A watermark for a structured result may be developed by altering the order of the elements contained within the structured result or by selecting an alternate search result from a plurality of search results such that a hash value based on the newly ordered structured result follows a binomial distribution with a parameter p which deviates away from $p=0.5$. A deviation away from $p=0.5$ can occur when a hash value contains a non-even distribution of 1s and 0s. The greater the deviation from $p=0.5$, the more detectable the watermark.

As shown in FIG. 1, a ranking score 330 for at least some of the structured results can be computed based upon a combination of the detectability of a watermark within a structured result and the quality of the structured result. A structured result of a plurality of structured results may be selected based on the ranking score 340.

The detectability of a watermark can be higher if the hash value contains more of one element (1s or 0s) than the other element (0s and 1s, respectively). For example, a hash value containing twenty seven 1s and five 0s is more detectable than a hash value containing fifteen 1s and seventeen 0s because the distribution of binary digits in the former hash value deviates highly from the binomial distribution with a p-value of $p=0.5$.

A structured result can be ranked more favorably for selection as a watermarked result if the structured result is unlikely to produce hash values that follow the $p=0.5$ (p-value) binomial distribution, and thus, are more detectable. The detectability of a watermark can be measured by a gain in the watermarking signal and is higher for structured results that are more detectable. A gain in the watermarking signal may be based on (without limitation) the number of occurrences of an element in a hash value, the ratio of a first element to a second element in a hash value, the number of consecutive similar elements in a hash value, etc. or a combination thereof. The implementation may create a watermark by selecting an alternative structured result or altering a structured result. The loss in quality should not exceed a maximum loss in quality threshold. For example, a search engine can provide several possible alternative results for a given query and rank the results from highest to lowest quality. The watermark can be created by selecting the highest quality result that meets a minimum detectability measure. Likewise, a search engine can provide several possible alternative results for a given query and rank the results from highest to lowest detectability. The watermark can be created by selecting the most detectable result that meets a minimum quality measure. For example, each result can contain several elements. The alternative results can vary in terms of their content and/or the ordering of elements. Quality can be related to the completeness, correctness and/or accuracy of the result in relation to the query. A result can be selected whose hash contains a binomial distribution whose distribution of binary digits has a p-value of $p=0.002$, e.g., it contains more 1s than 0s, even if it isn't the highest quality result. Such a selected structured result is detectable and can be said to have a high gain in the watermarking signal. The selected structured result may be more detectable as a watermark than the highest quality result, while the quality of the selected result may be sufficiently good to publish.

Enhanced detectability can be balanced with any loss in quality in various ways by the implementation. The loss in quality may be a number, a percentage, a ranking, a rating, etc. and may be based on, but is not limited to, a task specific quality metric, relevance of the order of the elements in the structured result, accuracy, popularity, view count, relevance, the deviation from an optimal structured result, etc. or a combination thereof. The implementation may produce a watermark by selecting an alternative structured result or altering a structured result given that the loss in quality does not exceed a maximum loss in quality threshold. For example, as shown in Table 3, a search query results in search result Set 1 (optimal search result set) and alternatively search result Set 2, Set 3 and Set 4. The maximum loss in quality threshold is 50%. The loss in quality corresponding to search result Set 1, Set 2, and Set 3 are 0%, 4%, and 29% respectively. Accordingly, Sets 1, 2, and 3 are below the maximum loss in quality threshold of 50% and thus are approved for being used as watermarked sets. Set 4 has a loss in quality of 54%, which exceeds the maximum loss in quality threshold of 50% and thus is not approved for being used as a watermarked set.

TABLE 3

| Search Result Set | Loss in Quality (%) | Quality Approval (Maximum Loss in Quality Threshold = 50%) |
|---|---|---|
| Set 1 (Optimal Set) | 0 | Yes |
| Set 2 (Alternative Set) | 4 | Yes |
| Set 3 (Alternative Set) | 29 | Yes |
| Set 4 (Alternative Set) | 54 | No |

A structured result that is selected to be a watermark can be made publicly available. The structured result that is selected as the watermarked result can be made available via (without limitation) an Internet based protocol, a World Wide Web browser, a network interface, a personal computer, a mobile computer, a mobile tablet, a software application, etc. or a combination thereof.

For a collection of search results $C_N = r_1 \ldots r_N$, we can define a watermark ranking function w to systematically select alternatives $r'_r \in D_k(q)$, such that the resulting $C'_N$ is unlikely to produce bit sequences that follow the p=0.5 binomial distribution of 1s (or 0s) in a bit sequence that is a hash of the result. Selecting an alternative r' from the space of alternatives $D_k(q)$ can be stated as:

$$r' = \arg\max_{r \in D_k(q)} w(r, D_{k_i}(q), h) \qquad \text{Equation 1}$$

where w ranks $r \in D_k(q)$ based on the presentation of a watermarking signal by r, where the watermarking signal is computed using a function h, which can be a hashing operation.

The bias away from p=0.5 can be characterized for each result r of a search query as follows:

$$w(r, D_K(q), h) = \frac{\#(1, h(r))}{|h(r)|} \qquad \text{Equation 2}$$

where h(r) can be a function (such as a hash function) that returns a bit sequence for result r and #(x,y) counts the number of occurrences of x in sequence y. Parameter w can be used as a biasing criteria to measure how skewed a given bit sequence is away from the p=0.5 binomial distribution.

Figure 4:
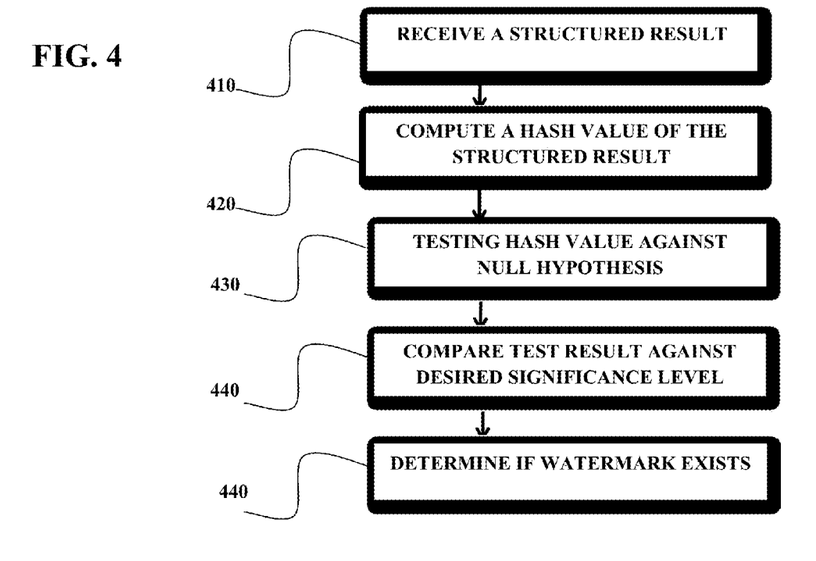
FIG. 4 shows a flowchart for detecting a watermark in a structured result according to an embodiment of the disclosed subject matter.

According to embodiments of the disclosed subject matter, the strength of a watermarking signal within a structured result can be estimated. As shown in FIG. 4, given a structured result 410, a bit sequence hash value for the structured result can be calculated 420 by applying a known hash function. The bit sequence can be tested against the null hypothesis 430 to determine the likelihood of a watermark 450, for example, whether the sequence is the product of a random variable having a binomial distribution with p=0.5. The probability that this null hypothesis is true for a given bit sequence can be expressed as a p-value. In particular, the likelihood that a bit sequence having n bits will have more ones than a given number x is:

$$p\text{-value} = P_n(X \geq x) \qquad \text{Equation 3 and Equation 4}$$
$$= \sum_{i=x}^{n} \binom{n}{i} p^i (1-p)^{n-i}$$

where p=0.5. The p-value can be compared against a desired significance level α, and the null hypothesis can be rejected for sequences for which the p-value is less than α. Comparing this p-value against the desired significance level α, the null hypothesis can be rejected to results that have $P_n(X \geq x) < \alpha$. For example, if one wishes to have a 94% confidence that a given sequence has been produced by a watermarking algorithm rather than having been generated randomly, one would require the sequence to have a p-value less than 0.06. This further implies a possible false positive rate of about six out of every 100 sequences. That is, the test will falsely indicate that a sequence has been produced using a watermarking algorithm about six out of every hundred sequences tested, when in fact those six sequences were not watermarked. The parameter α can be controlled on an application-specific basis. By biasing the selection of candidate results to produce more 1s than 0s (or vice versa), the implementation can define a watermarking approach that exhibits a fixed false positive rate and a task-independent hashing and selection criteria.

Implementations in accordance with the described subject matter can be robust to edit operations. Without a robustness feature, even slight modifications to the elements within an item r would yield completely different bit sequences (e.g., made using a hash function) that may no longer preserve the biases introduced by the watermark selection function. To ensure that the distributional biases introduced by the watermark selector are preserved, an implementation can map individual results into a set of sub-results, each one representing some local structure of r. Function h can then be applied to each sub-result, which can be concatenated to represent r. The mapping can be defined as a component of the h operation. While a particular edit operation may affect a small number of sub-results, the majority of the bits in the concatenated bit sequence for r may remain untouched, thereby limiting the damage to the biases selected during watermarking.

For example $r = z_1 \ldots z_L$ can be mapped into a set of consecutive n-gram sequences. Operations to edit a word $z_i$ in r will only affect events that consider the word $z_i$. To account for the fact that alternatives in $D_K(q)$ might now result in bit sequences of different lengths, the biasing criteria can be generalized to directly reflect the expected contribution to the watermark by defining:

$$w(r, D_k(q), h) = P_n(X \geq \#(1, h(r))) \qquad \text{Equation 5}$$

where $P_n$ provides probabilities from binomial (n=|h(r)|, p=0.5).

The null hypothesis is based on the assumption that collections of results draw uniformly from the space of possible results. This assumption may not always hold and depends on the types of the results and collection. For example, considering a text document as a collection of sentences we can expect that some sentences may repeat more frequently than others. This scenario can be even more likely when applying a mapping into sub-results. n-gram sequences follow long-tailed or Zipfian distributions, with a small number of n-grams contributing heavily toward the total number of n-grams in a document.

A random hash function can guarantee that inputs are distributed uniformly at random over the output range. However, the same input will be assigned the same output deterministically. Therefore if the distribution of inputs is heavily skewed to certain elements of the input space, the output distribution will not be uniformly distributed. The bit sequences resulting from the high frequency sub-results have the potential to generate inherently biased distributions when accumulated at the collection level. A mapping can be chosen that tends towards generating uniformly from the space of sub-results. The quality of a sub-result mapping for a specific task can be measured by computing the false positive rate on non-watermarked collections. For a given significance level $\alpha$, a mapping can result in false positive rates close to $\alpha$ as well.

If a watermarked result is selected from a group of relatively high quality results, the results in this group can be expected to share several sub-results. For example, the group can be the highest quality search results in response to a query. It can be expected that these results share many of the same elements. Generally, this is true when $D_k(q)$ represents the top results of a dynamic programming algorithm within an exponential search space. For example, alternative translations of the same input sentence are likely to share most of their n-grams, making it difficult to generate bit sequences that are significantly different with respect to the first best result. If the first best result has a negative signal (e.g., more 0s than 1s), it could be difficult to find a result that does not dilute the collection bias.

An alternative selector function and associated statistical test can help resolve this problem. Rather than selecting the candidate result with the highest ratio of 1s, the candidate can be selected with the maximum proportion of 1s or a maximum proportion of 0s. The corresponding w function would be:

$$w(r, D_k(q), h) = \frac{\max(\#(0, \in h(r)), \#(1, h(r))}{|h(r)|} \quad \text{Equation 6}$$

This selection criteria promotes skewed bit sequences on a per result level, regardless of direction, i.e., more 0s or more 1s.

This allows the watermarking criteria more flexibility in selecting candidates from $D_k(q)$ even when the sub-event mapping yields highly correlated bit sequences across alternatives. Under this criteria, a non-watermarked collection can be one whose individual results each generate bit sequences with approximately equal numbers of 1s and 0s.

The corresponding statistical test uses the following p-value defined over the bits generated for $C_N$. Rather than considering the probability of the accumulated bit sequence, we retain the boundaries between the bits generated for each result $r_i$. Let the bit sequence for $C_N$ be $C_N$, which is composed of N sub-sequences $c_i$, each generating $n_i$ bits with $y_i$ successes defined as:

$$y_i = \max(\#1, h(r_i)), \#(0, h(r_i))) \quad \text{Equation 7}$$

One can estimate the probability of producing a more unlikely bit sequence. The likelihood of a structured bit sequence of this form can be calculated because each result generates bits independently, but the definition of what constitutes a more unlikely sequence must consider bits from all results together. For example if $C_N$ contains two results, each one generating 10 bits and $y_1=7$, $y_2=8$, then more extreme sequences include those that have strictly higher y, such as $y_1=7$, $y_2=9$, as wells as those that have a lower y for some documents and more in others, e.g., $y_1=6$, $y_2=10$. We can therefore define the probability of a more extreme document bit sequence as:

$$P(C_N > c_1 \ldots c_N) = \quad \text{Equation 8}$$
$$\sum_{y'_1=1}^{n_1} \sum_{y'_2=1}^{n_2} \cdots \sum_{y'_N=1}^{n_N} \left( \delta < \left( \prod_i P_{n_i}(Y_i = y'_i), P(C_N = y_1 \ldots y_N) \right) \right)$$

where the $\delta<(x,y)$ returns x if $x<y$. This sums only those events that have lower probabilities than $c_1 \ldots c_N$. Computing this probability is exponential to N. We can optimize its computation using principles from a K-best extraction algorithm. By computing the highest probability elements of the sum first, the computation can be terminated if the running sum exceeds $\alpha$. Additional approximations, such as selecting samples from $C_N$, can also be applied to determine whether $P(C_N > c_1 \ldots c_N) > \alpha$. This alternative biasing method and classification function can increase the likelihood of finding an unlikely bit sequence at a higher rank from $D_k(q)$.

The watermarking described in Equation 3 chooses alternative results on a per result basis, with the goal of influencing collection level bit sequences. The selection criteria as described will choose the most biased candidates available in $D_k(q)$. The parameter k determines the extent to which lesser quality alternatives can be chosen. If all of the alternatives in each $D_k(q)$ are of relatively similar quality, the minimal degradation will ordinarily occur due to watermarking.

Specific tasks can be particularly sensitive to choosing alternative results. Different queries also differ in the inherent ambiguity expected from their results. In some cases, there can be only one correct result for a query, while for other queries, several alternative results may be equally good.

The definition of the w function can be generalized to interpolate the estimated loss in quality and the gain in the watermarking signal. This can show how to trade-off the ability to identify the watermarked collections against quality degradation:

$$w(r, D_k(q), f_w) = \lambda * \text{gain}(r, D_k(q), f_w) - (1-\lambda) * \text{loss}(r, D_k(q)) \quad \text{Equation 9}$$

The loss $(r, D_k(q))$ reflects the quality degradation that results from selecting alternative r as opposed to the best-ranked candidate in $D_k(q)$. For example, $$w(r, D_K(q), h) = \frac{\#(1, h(r))}{|h(r)|} \quad \text{Equation 2}$$

where rank(r) returns the rank of r within $D_k(q)$, cost(r) represents a weighted sum of features (not normalized over the search space) in a log-linear model and $r^1$ is the highest ranked alternative in $D_k(q)$. $\text{loss}_{rank}$ provides a generally applicable criteria to select alternatives, penalizing selection from deep within $D_k(q)$. This estimate of the quality degradation does not reflect the generating model's opinion on relative quality.

loss$_{cost}$ considers the relative increase in the generating model's cost assigned to the alternative translation.

The gain(r, D$_k$(q), f$_w$) function represents the gain in the watermarking signal by selecting candidate r. We can define the gain as P$_n$(X≥#(1,h(r)) from Equation 5.

Figure 2:
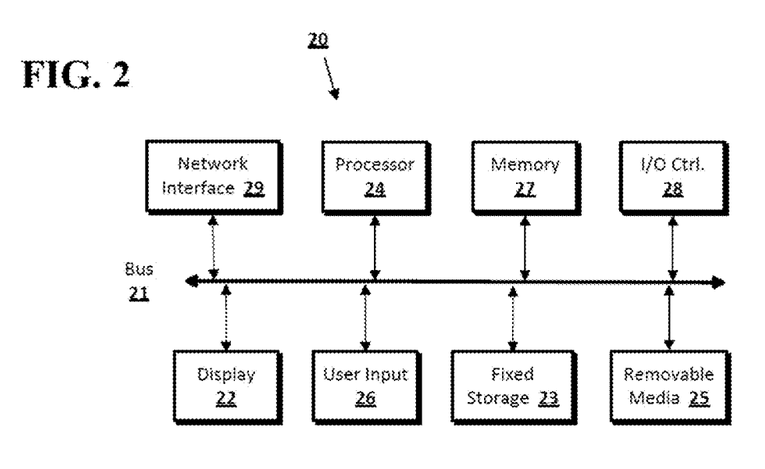
FIG. 2 shows a computer according to an embodiment of the disclosed subject matter.

Embodiments of the presently disclosed subject matter may be implemented in and used with a variety of component and network architectures. FIG. 2 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like. The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) that controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an Internet Service Provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 3.

Many other devices or components (not shown) may be connected in a similar manner (e.g., document scanners, digital cameras and so on). Conversely, all of the components shown in FIG. 2 need not be present to practice the present disclosure. The components can be interconnected in different ways from that shown. The operation of a computer such as that shown in FIG. 2 is readily known in the art and is not discussed in detail in this application. Code to implement the present disclosure can be stored in computer-readable storage media such as one or more of the memory 27, fixed storage 23, removable media 25, or on a remote storage location.

Figure 3:
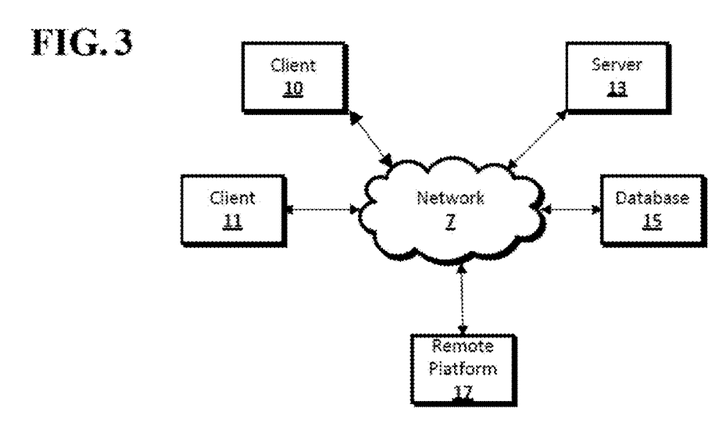
FIG. 3 shows a network configuration according to an embodiment of the disclosed subject matter.

FIG. 3 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

Figure 5:
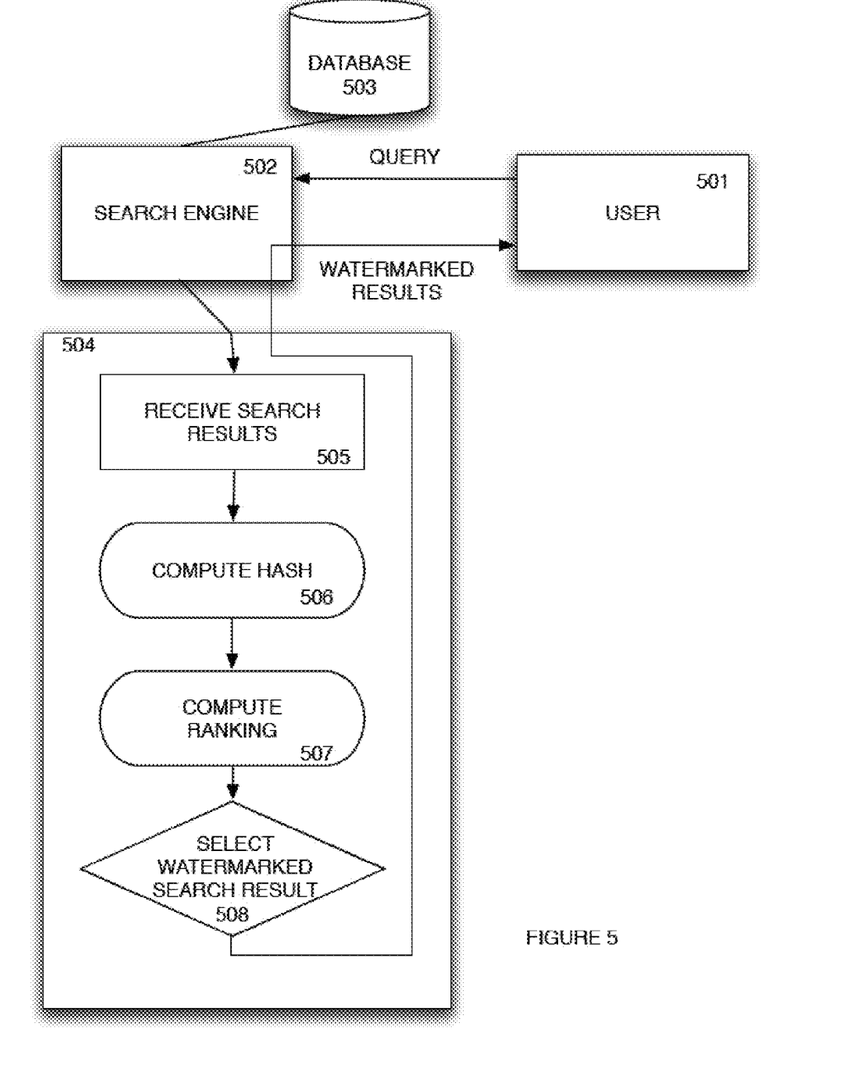
FIG. 5 shows a system for watermarking a structured result according to an embodiment of the disclosed subject matter.

Embodiments of the disclosed subject matter can be implemented such that the watermarking selection process is performed by one entity and the watermark verification process is performed by a second, distinct entity. As shown in FIG. 5, user 501 sends a query to search engine 502, which generates sets of alternative results. A watermark server 504 receives the sets of alternative results 505. The watermark server 504 computes a hash 506 and computes a ranking of the results 507. The watermark server 504 selects a watermarked result from the set of alternative results 508 and returns it to the search engine, which in turn can return the watermarked result to the querying user 501. This example is meant to be illustrative and not limiting. The watermarking server 504 can be used to select a watermarked result from any structured results, including translations, automatic text and rich media summarization, etc. This example computes a hash of the results 506, but any suitable function that yields a bit sequence can be used.

Figure 6:
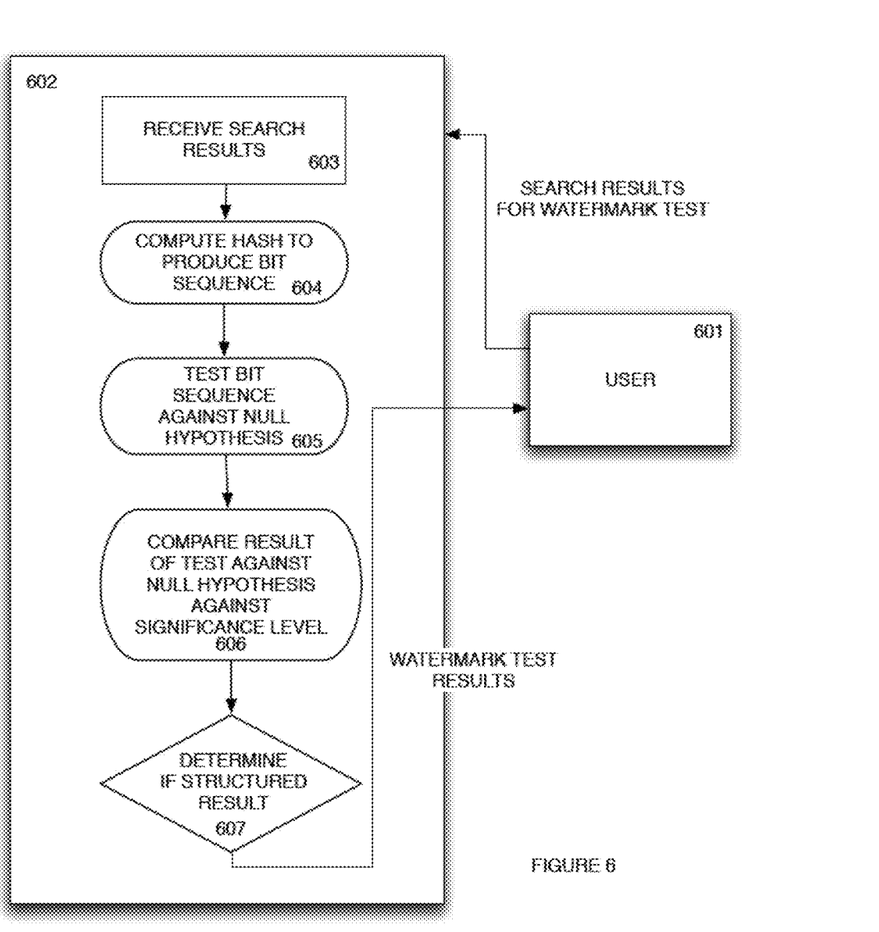
FIG. 6 shows a system for detecting a watermark in a structured result according to an embodiment of the disclosed subject matter.

As shown in FIG. 6, user 601 sends a search result to a watermark verification service 602. The watermark verification service 602 receives the search result, computes a hash to produce a bit sequence 603 and tests the bit sequence against the null hypothesis that the bits in the sequence occur in a binomial distribution with p=0.5. The results of the test are compared against a significance level 605. Depending on the results of the test 606, the watermark verification service can return a response to the user 601 that indicates whether the submitted result is or is not watermarked.

The foregoing description and following appendices, for purpose of explanation, have been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method, comprising:
receiving a plurality of alternative search results based upon a query from a user;
computing a hash of at least part of each alternative search result to produce a bit sequence corresponding to each alternative search result;
computing a first ranking score and a second ranking score for each alternative search result based upon its corresponding hash, the first ranking score for a specific alternative search result based upon a deviation of a distribution of binary digits in its corresponding hash from a binary distribution in which a parameter p=0.5 and the second ranking score for a specific alternative search result based upon a quality of the specific alternative search result; and
selecting one of the plurality of alternative search results based upon the ranking score to obtain a watermarked search result, the watermarked search result having been determined to include machine-generated content that is not appropriate for machine learning by a language translation model.

2. The method of claim 1, wherein the first ranking score and the second ranking score comprise a single ranking score.

3. A method, comprising:
computing a hash of at least part of each of a plurality of alternative structured results to produce a bit sequence corresponding to each alternative structured result;
computing a ranking score for each alternative structured result based upon a distribution of binary digits in its corresponding bit sequence; and
selecting one of the plurality of alternative structured results based upon the ranking score to obtain a watermarked structured result, the watermarked structured result having been determined to include machine-generated content that is not appropriate for machine learning by a language translation model.

4. The method of claim 3, wherein the watermarked structured result is a search result.

5. The method of claim 3, wherein the watermarked structured result is a machine-generated translation.

6. The method of claim 3, wherein computing the hash to produce the bit sequence for a specific alternative structured result comprises:
mapping the specific alternative structured result to a set of sub-results;
computing a hash of least some of the sub-results; and
concatenating at least some of the bit sequences for the sub-results for which the hashes are computed to produce the bit sequence corresponding to the specific alternative structured result.

7. The method of claim 3, wherein the ranking score for a specific alternative structured result is based upon a deviation of a distribution of binary digits in its corresponding hash from a binomial distribution with a parameter p=0.5.

8. The method of claim 3, wherein the ranking score is further based upon a quality measure of each alternative structured result.

9. The method of claim 3, wherein the ranking score for a specific alternative structured result is based on a number of occurrences of a given element in its hash in relation to a total number of elements in its hash.

10. A system, comprising:
a database storing a plurality of alternative structured results;
a processor in connection with the database, the processor configured to:
compute a hash of at least part of each alternative structured result to produce a bit sequence corresponding to each alternative structured result;
compute a ranking score for each alternative structured result based upon a distribution of binary digits in its corresponding bit sequence; and
select one of the plurality of alternative structured results based upon the ranking score to obtain a watermarked structured result, the watermarked structured result having been determined to include machine-generated content that is not appropriate for machine learning by a language translation model.

11. The system of claim 10, wherein the watermarked structured result is a search result.

12. The system of claim 10, wherein the watermarked structured result is a machine-generated translation.

13. The system of claim 10, wherein the processor is further configured to:
map a specific alternative structured result to a set of sub-results;
compute a hash of least some of the sub-results; and
concatenate at least some of the bit sequences for the sub-results for which the hashes are computed to produce the bit sequence corresponding to the specific alternative structured result.

14. The system of claim 10, wherein the ranking score for a specific alternative structured result is based upon a deviation of a distribution of binary digits in its corresponding hash from a binomial distribution with a parameter p=0.5.

15. The system of claim 10, wherein the ranking score is further based upon a quality measure of each alternative structured result.

16. The system of claim 10, wherein the ranking score for a specific alternative structured result is based on a number of occurrences of a given element in its hash in relation to a total number of elements in its hash.

* * * * *